US006361059B1

(12) United States Patent
Ellsworth

(10) Patent No.: US 6,361,059 B1
(45) Date of Patent: Mar. 26, 2002

(54) SINGLE PIVOT BICYCLE SUSPENSION APPARATUS AND RELATED METHODS

(76) Inventor: Anthony S. Ellsworth, 24562 Rutherford Rd., Ramona, CA (US) 92065

( * ) Notice: Subject to any disclaimer, the term of this patent is extended or adjusted under 35 U.S.C. 154(b) by 0 days.

(21) Appl. No.: 09/393,123

(22) Filed: Sep. 10, 1999

(51) Int. Cl.$^7$ ............................................. B62K 25/30
(52) U.S. Cl. ..................................................... 280/284
(58) Field of Search ................................. 280/283, 284, 280/285, 286

(56) References Cited

U.S. PATENT DOCUMENTS

| | | | | |
|---|---|---|---|---|
| 1,272,399 A | * | 7/1918 | Douglas .................... | 280/284 |
| 4,505,492 A | * | 3/1985 | Tsunoda .................... | 280/284 |
| 5,217,241 A | | 6/1993 | Girvin ....................... | 280/284 |
| 5,284,354 A | | 2/1994 | McWethy ................... | 280/284 |
| 5,335,929 A | * | 8/1994 | Takagaki et al. ........... | 280/283 |
| 5,553,881 A | * | 9/1996 | Klassen et al. ............. | 280/284 |
| 5,725,227 A | * | 3/1998 | Mayer ........................ | 280/284 |
| 5,921,572 A | * | 7/1999 | Bard et al. .................. | 280/284 |
| 5,957,473 A | * | 9/1999 | Lawwill ..................... | 280/284 |
| 6,036,213 A | * | 3/2000 | Busby ........................ | 280/284 |
| 6,086,080 A | * | 7/2000 | Scheffer .................... | 280/283 |
| 6,109,639 A | * | 8/2000 | Klein et al. ................ | 280/284 |
| 6,139,039 A | * | 10/2000 | Becker ....................... | 280/283 |
| 6,161,858 A | * | 12/2000 | Tseng ...................... | 280/282.1 |
| 6,164,676 A | * | 12/2000 | Wilcox ....................... | 280/284 |
| 6,206,397 B1 | * | 3/2001 | Klassen et al. ............. | 280/284 |

* cited by examiner

Primary Examiner—Robert P. Olszewski
Assistant Examiner—Andrew J. Fischer
(74) Attorney, Agent, or Firm—Stout, Uxa, Buyan & Mullins, LLP.; Greg S. Hollrigel

(57) ABSTRACT

A single pivot shock absorbing wheel suspension system includes a seat stay and chain stay attached at their rearward ends to a rear wheel axle, and attached at their forward ends to a linkage assembly. The linkage assembly is formed from a single piece of material and generally has an elongated body with attachment elements to attach the forward ends of the seat stay and chain stay. The linkage assembly constitutes a lightweight device that resists torsional forces occurring on the suspension system, and permits optimal alignment of the pivot point and the average chain line to improve bicycle performance. Related methods, including methods for manufacturing the linkage assembly, are also disclosed.

15 Claims, 4 Drawing Sheets

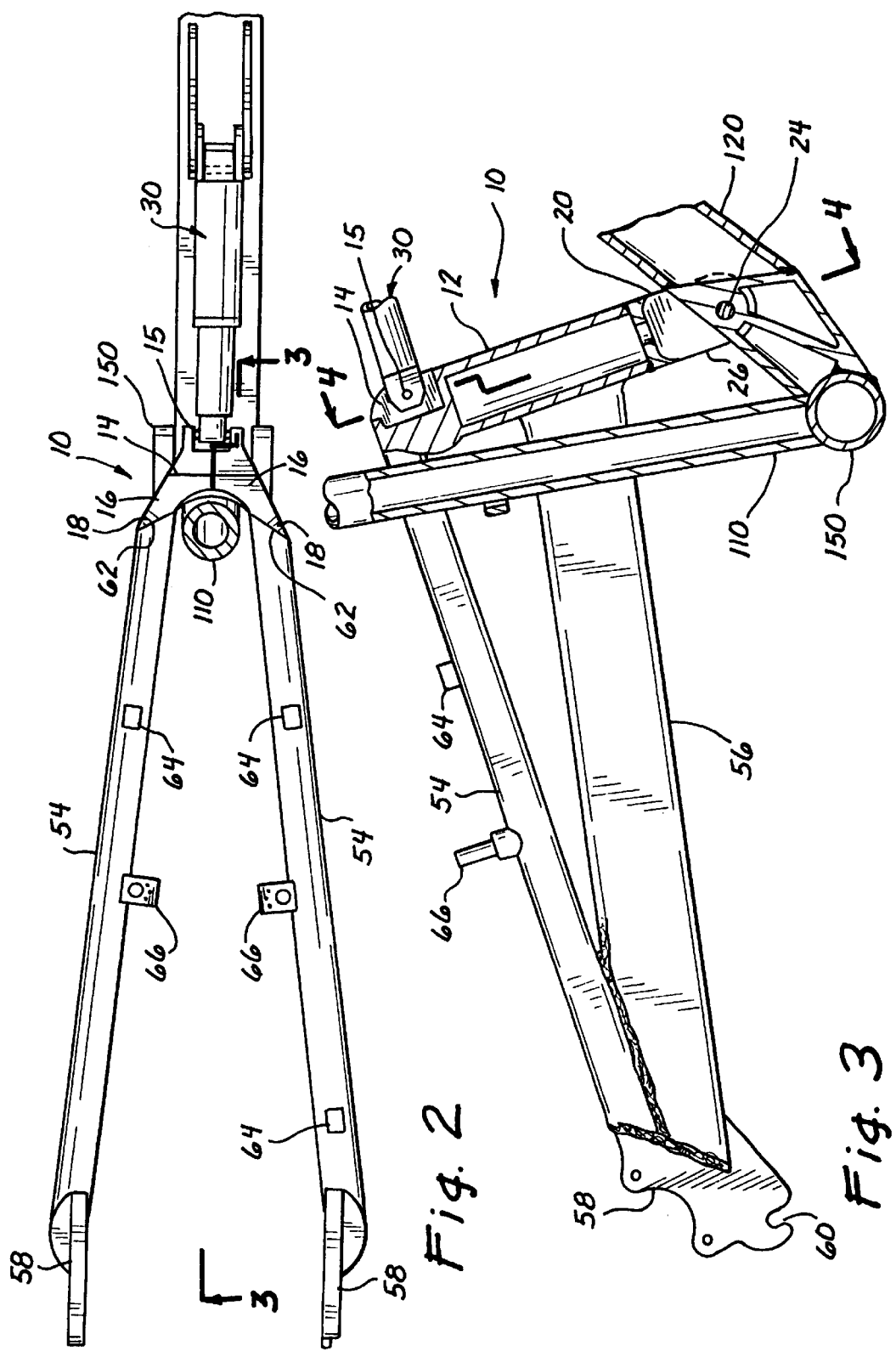

SINGLE PIVOT BICYCLE SUSPENSION APPARATUS AND RELATED METHODS

The invention generally relates to a shock absorbing wheel suspension apparatus and a method of manufacturing same. More particularly, the invention is directed to a device used in bicycle single pivot suspension systems that is lightweight, reduces the number of components required for the system, and provides good performance and resistance to torsion, torque, and other forces on the suspension system.

BACKGROUND OF THE INVENTION

Several types of bicycles, especially in the field of mountain bikes, include a variety of rear wheel suspension systems to attempt to improve performance and safety of bicycles and to increase comfort for bicycle riders. However, these suspension systems typically are very complicated structures involving many pivot points and/or several related components which result in increased and undesirable bulk and weight to the bicycle.

Although relatively more simple suspension systems providing only a single pivot point on the bicycle frame typically have fewer components, they still are commonly fabricated from a number of separate components, increasing inventory, design, and manufacturing costs, among other things. Moreover, those relatively simpler designs typically still are lacking with respect to their performance.

For example, one such suspension system is disclosed by U.S. Pat. No. 5,217,241 (to Girvin). The '241 patent is directed to a bicycle with a wheel suspension having a single pivot axis requiring a rigid bridge tube connected to a seat tube and a down tube. The bridge tube positions the pivot point above the largest chain sprocket. Although this positioning of the pivot point is intended to translate pedal induced forces into forward motive forces, it actually provides a lifting moment to the suspension which is slight in the large chainring and greater in the smaller chainrings.

Although single-pivot designs such as the '241 patent can be somewhat simple in construction and somewhat non-pedal-torque reactive in a certain chainring-gear combinations, they usually are very pedal-torque reactive in the chainring farthest away horizontally from the pivot. In the small chainrings, this construction typically lifts the bike and rider with an energy-wasting "inchworm" bobbing effect with each pedal stroke and its accompanying chain torque. This suspension does not adequately respond to bump loads under hard pedaling, as bump force must overcome the lifting moment in order to move the wheels in reaction to a bump. Also, due to its arc-like wheel path during shock absorption motion, the wheelbase dimension changes throughout the wheel's stroke, causing kickback while pedaling.

In addition, the chain stays of the bike in the '241 patent are vertically bent to clear the front derailleur and require a connecting tube between each of the chain stays to facilitate bracing the suspension system against transverse or lateral forces on the rear wheel. Moreover, the seat stays are attached to a shock absorbing element positioned behind the seat tube. Because this system relies primarily on the bridge tube and the connecting tube to resist transverse or lateral forces on the rear wheel, it requires also using a bulky and sometimes heavy swingarm, as well as overbuilding the pivot and pivot supports, to maintain sufficient or desirable rigidity, which adds undesirable weight to the bicycle.

Similarly, U.S. Pat. No. 5,284,354 (to McWethy) discloses a bicycle with a single pivot point rear wheel suspension system. The bicycle also discloses a cross bar or bridge tube to pivotably attach a rear wheel swing arm. The swing arm is vertically bent to clear the chain sprockets, and is laterally bent to accommodate a rear wheel axle. In addition, the bicycle has a bent seat tube, apparently in an attempt to improve performance of the shock absorber. However, this bike likewise suffers from the reliance of transverse support from the seat tube, the cross bar, and a gusset positioned between the two stays of the swing arm.

Other bikes have attempted to improve on these shortcomings, such as by securing both chain stays and seat stays to a linkage assembly positioned in front of a seat tube with a shock absorber attached to the linkage and to the bicycle frame. Examples of these bikes can currently be seen at the Internet websites for the bicycle companies, Santa Cruz Bicycles and Cannondale Bicycles.

The Santa Cruz website, for example, appears to disclose a complicated assembly to attach the seat stays and chain stays of a rear wheel swing arm to a bicycle frame. That connection assembly consists of two approximately vertically oriented support structures connected at their upper end to the forward ends of the seat stays, and connected at their lower end to a pivot point on the down tube of the bicycle frame. At an intermediate location, chain stays are welded to the outer sides of the support structures. In addition, and at approximately the same vertical location on the support structures, a brace is provided between those vertical structures. This brace apparently is intended to improve torque resistance of the linkage assembly. The complex construction of these assemblies, including the numerous separate elements of the assembly and the corresponding necessity for increased welding sites, results in a relatively heavy device with potential weak points occurring at the welding sites, as well as increases the amount of time and effort in construction of the assembly.

OBJECTS AND ADVANTAGES OF THE INVENTION

It is, therefore, an object of the invention to provide a single pivot suspension system useful, for example, in connection with the rear wheel of a bicycle such as a mountain bike, which addresses the shortcomings mentioned above.

Among other things, it is an object of the invention to provide a device to pivotably attach a rear wheel swing arm to a bicycle frame wherein the device includes a single elongated body; a connector attached to the body to pivotably connect the device to a bicycle frame; and at least one swing arm attachment element with at least one extension element to attach the forward portions of a rear wheel swing arm to the device. The device is sufficiently lightweight and strong to resist torsional forces occurring on the wheel suspension system. The device is also configured to attach to a shock absorber that is attached at its other end to the frame of the bicycle.

It is a further object of the invention to provide the device of the aforementioned character wherein the body of the device is generally tube-shaped, and in which the body and the attachment element are formed from a single piece of material.

It is yet another object of the invention to provide the device of the aforementioned character in which the extending portions each include confronting surfaces oriented toward the rear of the bicycle and angled with respect to a plane defined by a top tube, a down tube, and a seat tube of the bicycle frame.

It is still another object of the invention to provide a wheel suspension system having a single pivot axis about a frame in which the suspension system includes a seat stay and a chain stay attached at their rearward ends to a joint that attaches to an axle of a wheel; and attached at their forward ends to a linkage machined from a single piece of material, wherein the linkage has at least one extension element extending from the linkage to attach the seat stay and the chain stay, and in which the suspension system further includes an attachment piece to attach the wheel suspension system to the frame and to permit the wheel suspension system to pivot about the site of attachment. The suspension system is operably connected to a shock absorbing element positioned between the system and the frame.

It is yet another object of the invention to provide the system of the aforementioned character in which the seat stay and said chain stay are provided as a single element.

It is also an object of the invention to provide a forward attachment member for a single pivot bicycle rear wheel support, including at least one brace to attach a rearwardly positioned swing arm assembly; and a yoke to secure the attachment member at a pivot point on a frame of the bicycle, wherein the member and yoke are configured so that the pivot point is generally located on an average chain line in the bicycle's normally laden position. The attachment member is also secured to one end of a shock absorber. The attachment member is configured to resist lateral forces that may occur on the rear wheel.

Another object of the invention is to provide an apparatus for suspending a wheel from a bicycle, including generally linear stay elements on each side of the wheel; a pivotable, generally tubular element extending in a generally upright direction having protruding portions formed integrally with the element to attach to the forward ends of the stay elements and configured to position the stays to permit free rotation of the bicycle wheel.

It is still another object of the invention to provide a rear wheel suspension for a bicycle having an elongated member formed from a single piece of material, in which the elongated element has at least one first connection element for operative attachment to a shock absorbing member, at least one second connection element for connection to a shock stay member, and at least one third connection element for connection to a chain stay member.

It is another object of the invention to provide a bicycle wheel suspension element that has a hollow body, a first attachment structure associated with the body for attaching said element to a pivot location on a bicycle frame, and a second attachment structure, with at least one lateral projection, spaced from the first attachment structure for attachment to at least one rearwardly projecting stay.

It is a still further object of the invention to provide a link to operably attach a rear wheel suspension apparatus to a pivotable connector on a bicycle, wherein the link includes a single generally tubular elongated body and at least one attachment element, both formed from a single piece of material. The attachment element preferably extends laterally from a longitudinal midline, to attach the rear wheel suspension apparatus.

It is another object of the invention to provide a method of manufacturing a single monolithic element as the central attachment element of a rear wheel suspension, including the steps of: a) forming the material for the element into an elongated piece having a cross-section with a central portion and at least one attachment portion protruding therefrom; b) shaping the outer surface of said element to remove some of the attachment portion along the length of the element, so that the attachment portion remains at at least one selected location along the length of the element; and c) removing unnecessary material from the inside of said element.

Other objects and advantages of my invention will be apparent from the following specification and the accompanying drawings, which are for the purpose of illustration only.

BRIEF DESCRIPTION OF THE DRAWINGS

All of the drawing figures filed herewith and discussed herein are simply representative illustrations of the current preferred embodiment of the invention. Persons of ordinary skill in the art will understand that a wide variety of other embodiments can be utilized to practice the invention.

FIG. 2 is a top view along line 2—2 in FIG. 1.

FIG. 3 is a side view along line 3 in FIG. 2, illustrating one half of a preferred embodiment of the wheel suspension including a rear wheel swing arm incorporating a front linkage assembly.

DESCRIPTION OF PREFERRED EMBODIMENT

Figure 1:
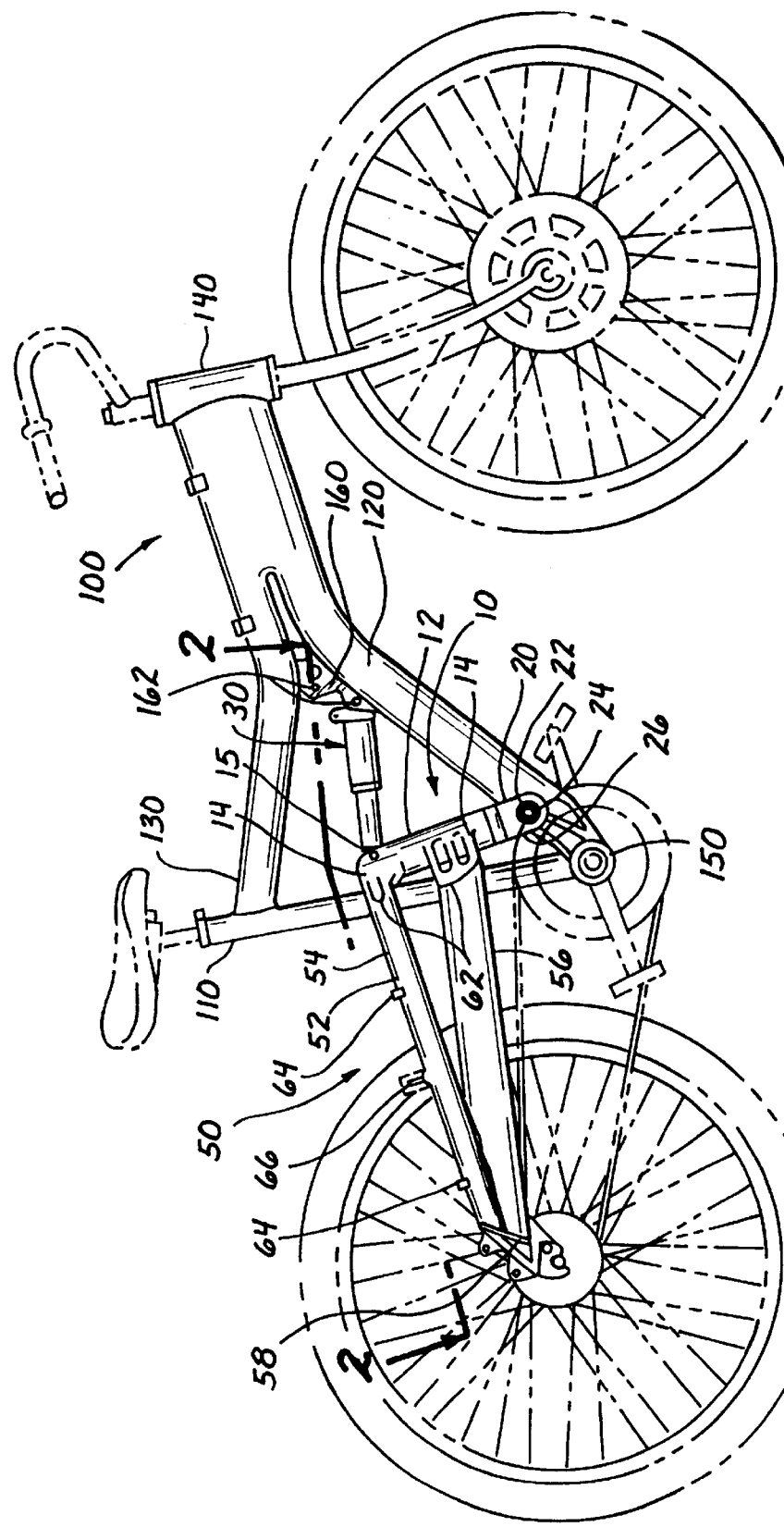
FIG. 1 is a side view of a bicycle illustrating a preferred embodiment of a wheel suspension system having a single pivot axis.

Referring to the drawings, and particularly to FIG. 1 thereof, 1 show a preferred embodiment of a rear wheel suspension system 50 pivotably attached to a bicycle frame 100.

The various components of the invention, as well as the bicycle itself, may be fabricated in a wide variety of ways and from a wide variety of materials, all of which will be readily understood by persons of ordinary skill in the art. Among other things, strong, light-weight materials are preferred, to reduce the energy required by the rider during riding as well as during manufacturing, shipping, and other transportation of the bicycle (such as loading onto bike racks, etc.).

In FIG. 1, bicycle frame 100 generally and preferably consists of a seat tube 110 and a down tube 120, both attached to a bottom bracket 150 to house a pedal assembly; a top tube 130; and a fork tube 140; all welded or otherwise secured together to define the frame of the bicycle. Although the frame 100 preferably includes all of the foregoing tubular members, alternative embodiments can have more or less than all of the foregoing tubes, and can include them in various forms, sizes, and configurations, and still achieve the intended functionality and beneficial aspects of the invention. Persons of ordinary skill in the art will understand that for purposes of this invention, the frame 100 can incorporate a number of other elements and features without departing from the intended scope of the invention.

The preferred wheel suspension system 50 generally consists of a rear wheel swing arm 52 secured to a linkage 10. Rear wheel swing arm 52 preferably includes a pair of seat stays 54 and a pair of chain stays 56 attached to each other at their rearward ends as part of a pair of joints 58. The joints 58 each also preferably include conventional features such as a cut-out portion 60 to receive an axle of a rear wheel. Persons of ordinary skill in the art will appreciate that the exact configuration and relationship between the seat stays, chain stays, and joints can vary depending on, among other things, the size of the bicycle, the range of gear rings to be mountable on the bike, or the shape or size of the wheel or its axle. In addition, the individual stays and joints are preferably welded together at their respective junctions, but alternative embodiments can secure these components by any similar manner or can even embody these components as a single construction formed from a precast mold or the like.

In the preferred embodiment of the swing arm, the stays are provided in corresponding pairs, with one brace or stay of each pair positioned on either side of the rear wheel; however, alternative embodiments can include, by way of example, and not limitation, a seat stay and a chain stay positioned only one side of the rear wheel, or a seat stay and a chain stay positioned on alternate sides of the rear wheel. Moreover, other embodiments of the invention (not shown) can utilize teachings of the invention on less than all of the stays of a rear swing arm assembly.

In addition, other alternative embodiments of the wheel suspension system 50 (again, not shown) can include a swing arm in which the seat stay and chain stay are formed integrally as, and combined into, a single element. For example, each side of the swing arm could include a single extended stay element sufficiently wide to provide the functionality of both the seat stay and chain stay (as explained above, these are illustrated in FIG. 1 as separate stays 54 and 56, respectively). For example, the void between the seat stay and chain stay could be eliminated by forming each side of the swing arm as a single wide piece. Other of the many alternative embodiments of the invention would include the swing arm being provided with a smaller cross section and appropriately configured to clear the sprockets and derailleurs of the bicycle and to provide the proper support for the wheel suspension.

Rear wheel swing arm 52 can also include one or more elements such as conventional braze-on elements 64 to secure cables and the like to the frame and keep them away from interfering with the movement and operation of the bicycle. The preferred embodiment of the seat stay 54 also includes brake mounts 66 to attach a braking device (not shown) for the rear wheel.

Each of the seat stays 54 and the chain stays 56 are preferably attached at, or near, their forward ends to a linkage member or device 10 that pivotably attaches the swing arm 52 to the bicycle frame 100. In that regard, the stays preferably have a mating surface 62 at their forward ends (forward with respect to the bicycle's normal direction of travel) to abut the device 10 at a surface 18 of attachment elements 14 formed on the device 10 (see FIG. 2; and discussion below). The stays are preferably welded or otherwise connected at this abutment to secure the stays to the linkage member 10.

The device or linkage 10 preferably constitutes or at least includes a forward attachment member for the bicycle rear wheel support or swing arm 52, and preferably includes an elongated body member 12 attached at its lower end to a connector or yoke 20 to attach the link 10 to the bicycle frame. Thus, in the preferred embodiment, the yoke 20 can be understood to generally be an attachment piece (in the preferred embodiment, this is separate from the aforementioned forward attachment member) to attach the wheel suspension system to the frame.

The preferred embodiment of the yoke 20 includes a hole 22 positioned in two sidewalls 26, each of the sidewalls 26 to be positioned on either side of the downtube 120. The yoke 20 is preferably a separate element formed by extrusion or molding of suitably strong material, such as metal, welded to the elongated member 12; however, alternative embodiments can include forming the yoke 20 integrally with the body 12, and thereby eliminating any additional welding or securing steps to attach the yoke to the body. Moreover, the yoke or connection element 20 can be provided in a wide variety of configurations (not shown in the drawings), any of which can accomplish the desired pivoting action between the suspension and the rest of the bike frame.

The yoke or connector 20 permits the device 10 to pivot about a pivot location 24 located on the bicycle frame. The pivot location 24 is preferably aligned with an average chain line when the bicycle is in its normally laden position (the "laden" condition is the normal operating position of the suspension linkage as set up by the individual rider, and is based, among other things, on the rider's weight), as discussed elsewhere herein. In the preferred embodiment, the pivot point 24 is positioned on the down tube 130 of the bicycle frame near the chain sprockets and in front of the seat tube 110.

Also in the preferred embodiment of the invention, the pivot point 24 is further forward and/or lower on the frame than the pivot sites of any prior art single pivot suspension systems of which the inventor is currently aware. Among other things, this improves and provides the aforementioned ability of the pivot point 24 to be so closely positioned on the average chain line in the normally laden position. Among other things, this desirable alignment effectively results in more energy-efficient translation of pedaling forces into propulsive forces to improve the bicycle's performance and ease of use.

With respect to the average chain line, as persons of ordinary skill in the art will readily understand, the average chain line generally is the average longitudinal alignment of the upper generally horizontal drive chain (the part of the chain normally in tension when the bike is pedaled) as the chain is variously positioned on the largest and smallest sprockets of the pedal assembly and the rear wheel.

For example, most current art bicycles include three front chain sprockets and several rear chain sprockets (also referred to as "gear rings"). For purposes of this disclosure, the "average" chain line is determined by projecting a straight line through two tangent points, one associated with each of the front and rear sprocket assemblies or gear ring sets. The tangent point for any particular sprocket assembly is preferably the average of the radii for the largest and smallest gears on the assembly. In other words, the tangent line projections through the midpoints of the range of radii for each sprocket assembly is the "average" chain line. As persons of ordinary skill in the art will further appreciate, if there is only a single front and rear sprocket, the average chain line is in line with the actual line projecting through the upper portion of the chain.

Positioning the pivot axis at or very near the average chain line aligns many of the relevant forces on the suspension with those exerted by the rider via the chain line, at least in the most commonly used gears of the gear range. Among other things, this alignment minimizes or at least typically reduces undesirable torque and other interactions between the suspension and the drive chain, thereby improving the translation of the pedaling forces into forward motion of the bicycle.

The linkage 10 also preferably includes an attachment site 15 for a shock absorbing element 30, which is preferably secured at its opposite end to another attachment site 162 situated on a brace 160. The shock absorbing element 30 may consist of any suitable shock absorbing construction, such as a wire coil, elastomer, air or other medium spring with an oil, air or other medium damper, or any other suitable expedient. In the preferred embodiment of the bicycle, the brace 160 is welded to the down tube 120, but the brace could alternatively be formed integrally with the down tube, or furthermore, the second attachment site 162 for the shock absorber could be formed directly on the down tube 120. In addition, alternative embodiments could secure the forward end of the shock absorber to the top tube 130 or even to the fork tube 140, and still achieve certain beneficial aspects of the invention. For embodiments using "pull shock absorber" technology, the pull shock could be mounted between the wheel suspension and the frame at a variety of locations including the seat tube.

As can be seen in FIGS. 1–4, the linkage 10 also preferably includes a plurality of attachment elements 14 to attach the forward ends of the seat stays 54 and chain stays 56 of the swing arm 52, as indicated above. In alternative embodiments, not shown, various aspects of the invention may be practiced by providing only one such attachment element 14, attaching a plurality of stays 54 and/or 56 to a "single" attachment element 14, or other various configurations of those elements or their equivalents.

Preferably, the body member 12 and the attachment elements 14 are formed from a single piece of extruded metal or other suitably strong material. Persons of ordinary skill in the art will understand, however, that some of the many alternative embodiments can include forming the attachment elements as separate pieces and welding, or otherwise securing, the elements to the body member 12. The preferred linkage 10 provides a generally cylindrically cross-sectioned element to which the stay or stays and the shock absorber are connected.

Forming the linkage 10 from a single piece of material imparts many beneficial features of the linkage devices currently used. Among other things, the preferred linkage 10 improves the torque resistance of the wheel suspension system because there are no welding sites within the linkage itself, thereby reducing any potential weak points such as a welding joints. In addition, forming the linkage 10 as a monolithic element can reduce the weight and complexity of the system, resulting in lowered inventory, assembly, maintenance, and other costs. The reduced weight and other aspects of the preferred linkage improves performance and reduces costs for riders and consumers. As discussed above, systems of which the inventor is currently aware all require a plurality of components (such as separate lateral bracing elements or the like) to contribute to the resistance to lateral forces on the rear wheel, and have numerous welding sites that are potential weak points, or even failure or breakage points, in the suspension system. This is especially true for the substantial torque forces that commonly occur in mountain biking applications.

The linkage 10 can be manufactured as a single piece in any suitable manner. Among the many methods of fabrication is the preferred method described herein. Preferably, the material to make the linkage 10 is initially formed into an elongated piece, by extrusion, cold-forming, casting or other process. In the preferred process, that initial forming step results in a piece of material having a cross-section with a central portion and at least one attachment portion protruding from the piece. That cross-section is preferably approximately or exactly the "final" cross-section of the element 10, similar to the shape generally shown in the top view of FIG. 2 (if that view were taken directly down along the longitudinal central axis of linkage 10).

The preferred extruded piece can be cut to a desired length either at this stage or after the possible step of further shaping the outer surface of the piece. That further shaping can include smoothing and/or removing some of the attachment portion so that the protruding (when viewed from above, as discussed in the preceding paragraph) attachment portion 14 remains at a selected location or locations along the length of the element. If desired, the attachment portion or portions 14 can be shaped differently (by machining or otherwise) at different locations along the length of the linkage 10. Among other things, this would permit the corresponding stay elements to be modified and joined to the linkage 10 at different locations and/or different angles.

A further alternative step is to remove material from the inside of the element 10, by boring, drilling, or similar process. This process, along with the milling or other turning on the exterior of the body member 12, preferably results in a generally circular in cross section (except at those locations at which the attachment elements 14 are located, as noted above). Alternatively, the element 10 could have differently shaped general cross-sections (such as elliptical, ovoid, or triangular), so long as the lateral torque resistance of the linkage member or the overall suspension system is maintained. As indicated above, to reduce the weight of the linkage 10, the preferred elongated body 12 is bored from its lower end (as viewed in FIGS. 1 and 3) to create a generally elongated tube. The depth of the bore into the element 14 can vary, but preferably the bore removes as much material (and consequently as much weight) as possible while retaining sufficient strength to withstand the forces to which it will foreseeably be subjected. In the drawings, the bore extends upwardly into the body so that it reaches approximately the lower end of the upper attachment element 14.

The aforementioned machining steps, or any of the various combinations of them with each other or other steps, are preferably accomplished by mounting the unmachined element in a four-axis computer milling station (CNC milling station) (for example, the preferred embodiment is constructed and shaped in at least three axes). No bicycle linkage assembly, or any other bicycle frame component, of which the inventor is aware utilizes such a consolidated method of manufacturing. Instead, as noted above, current art front linkage assemblies are composed of multiple elements that are secured together after they are cut or otherwise machined.

Moreover, although the preferred embodiment of the invention utilizes two attachment elements 14, alternative embodiments could utilize one attachment element (as indicated above), if such single attachment element were sufficiently long to permit attachment of all of the desired stay elements (such as the seat stay and chain stay as described herein) somewhere along the length of the attachment element 14. As indicated above, if the stays were positioned relatively more closely together in the vertical direction (or were even replaced by a single stay on each side of the rear wheel), the attachment element or elements could be relatively shorter. In other alternative embodiments, the attachment elements 14 can be provided for less than the full length of the corresponding abutting surface of the stay or stays, in which case the weld or other joint between the stay and the attachment element would not extend across the entire end of the stay.

As illustrated in FIG. 2, the attachment elements or braces 14 preferably include a pair of extension arms 16 having a confronting surface 18 for abutting the mating surface 62 of the seat stay and chain stay of the suspension system, as discussed above. The pair of extension elements 16 can be perceived to define a "wing-shaped" (as viewed from the top, similar to the view of FIG. 2) structure that extends bilaterally around seat tube 110. The extension elements 16 preferably extend generally laterally to the sides of the seat tube and include generally forward-facing cutout portions 17 to further reduce the weight of linkage 10. Persons of ordinary skill in the art will understand the preferred aerodynamic orientation and shaping of the various elements of the linkage 10 and other aspects of the invention (including the just-mentioned cutouts 17).

On the generally rearward facing side of the preferred extension elements 16 (generally opposite or "behind" the cutout portions 17) are confronting surfaces 18. Preferably, these surfaces 18 are angled with respect to a plane defined by the top tube 130, down tube 120, and seat tube 110, to maximize or enlarge the contact area with the abutting stay elements, improve the stress bearing characteristics of the joint at those confronting surfaces and provide a more aerodynamic profile for the suspension. Persons of ordinary skill in the art will understand, however, that a wide variety of confronting surface shapes, angles (including orthogonal when viewed from above), and contact surfaces can be utilized within the practice of alternative embodiments of the invention.

Also preferably, the extension element surfaces 18 help permit the seat stays 54 and chain stays 56 to project linearly toward their rearward ends to accommodate the rear wheel axle. This linear configuration of the stays similarly improves torque resistance of the wheel suspension by reducing potential weak spots due to laterally bending or kinking the stays to accommodate the relatively wider position at the wheel axle.

Figure 4:
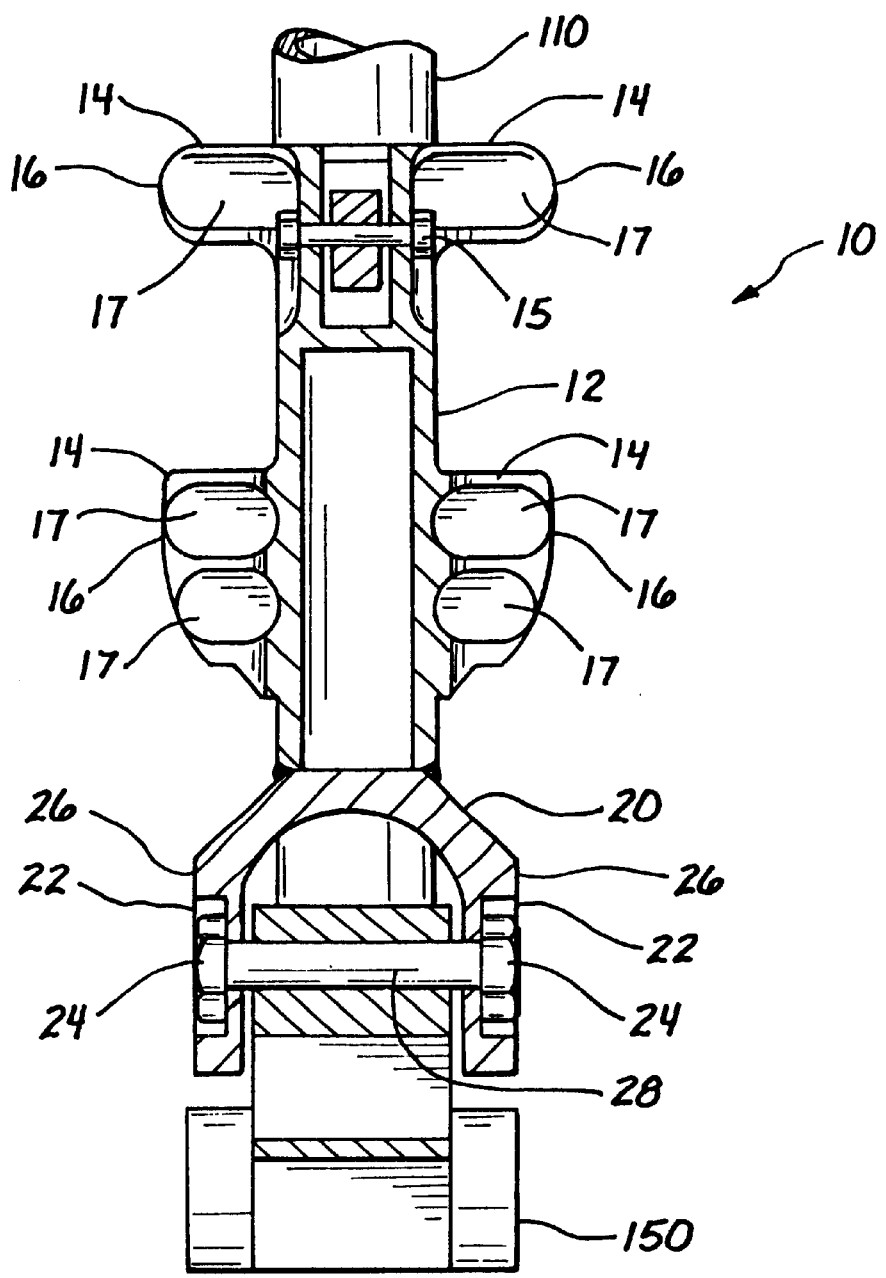
FIG. 4 is a front view along line 4—4 in FIG. 3.

FIGS. 3 and 4 depict, among other things, sectional views of the preferred linkage assembly. Among other things, they illustrate the preferred positioning of the shock absorber 30 with respect to its attachment site 15 located on linkage assembly 10. In the preferred embodiment of the invention, the attachment site 15 is located in a recessed portion of the upper attachment element 14. A pin or shaft preferably serves as the attachment site for the shock absorber. The pin extends through the end of the shock absorber to permit the shock absorber to pivot about that pin. Although the preferred embodiment illustrates positioning the end of the shock absorber within a recess of the attachment element 14, alternative embodiments could position the shock absorber at any of a wide variety of locations and positions, on the outer surfaces of the attachment element or otherwise. This could be accomplished, for example, by providing a yoke on the end of the shock absorber and tapering the attachment site to fit within the shock absorber yoke. Other examples can also be appreciated and still fall within the scope of the invention.

Likewise, yoke 20 preferably straddles a portion of down tube 120 and is configured to receive a pin positioned at the pivot point 24 inserted through the down tube 120. However, alternative embodiments can include a yoke constructed as part of the bicycle frame and having a receiving element at the lower end of the linkage 10 to be inserted between the sidewalls of the yoke. In addition, the connector 20 could be alternatively constructed to provide only a single sidewall 26 to be secured to a pin or shaft on or in the bicycle frame and to pivot thereabout.

Figure 5:
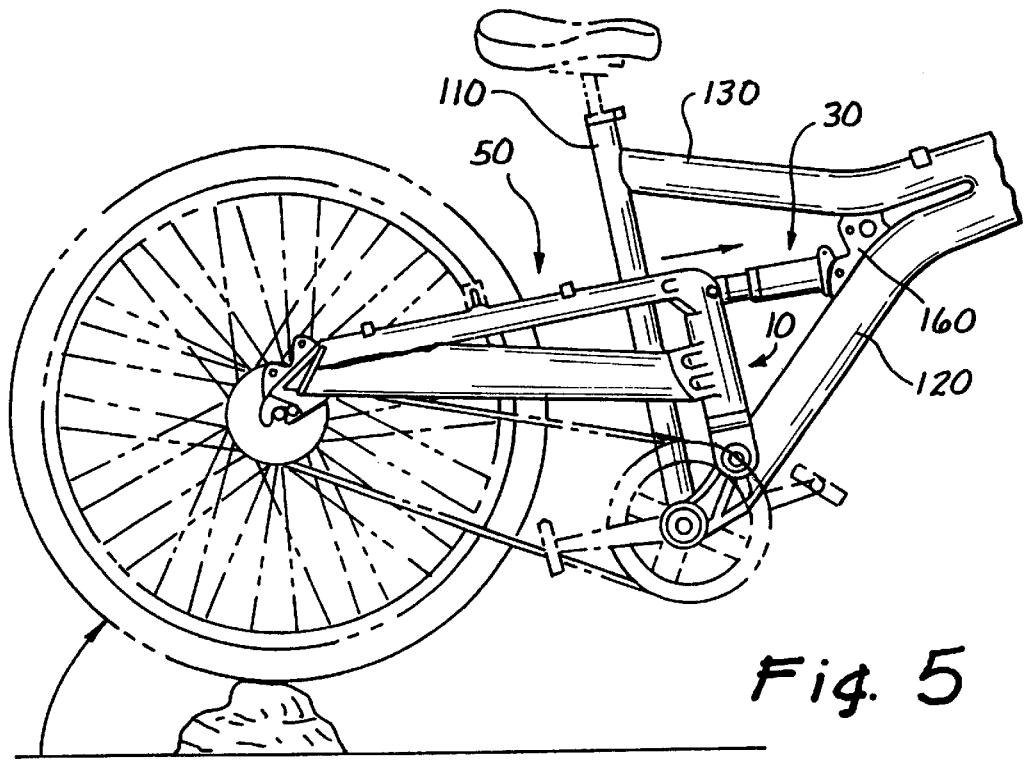
FIG. 5 is a side view of a preferred embodiment of the invention, illustrating the pivotal actions as the rear wheel hits a upwardly protruding obstacle.
Figure 6:
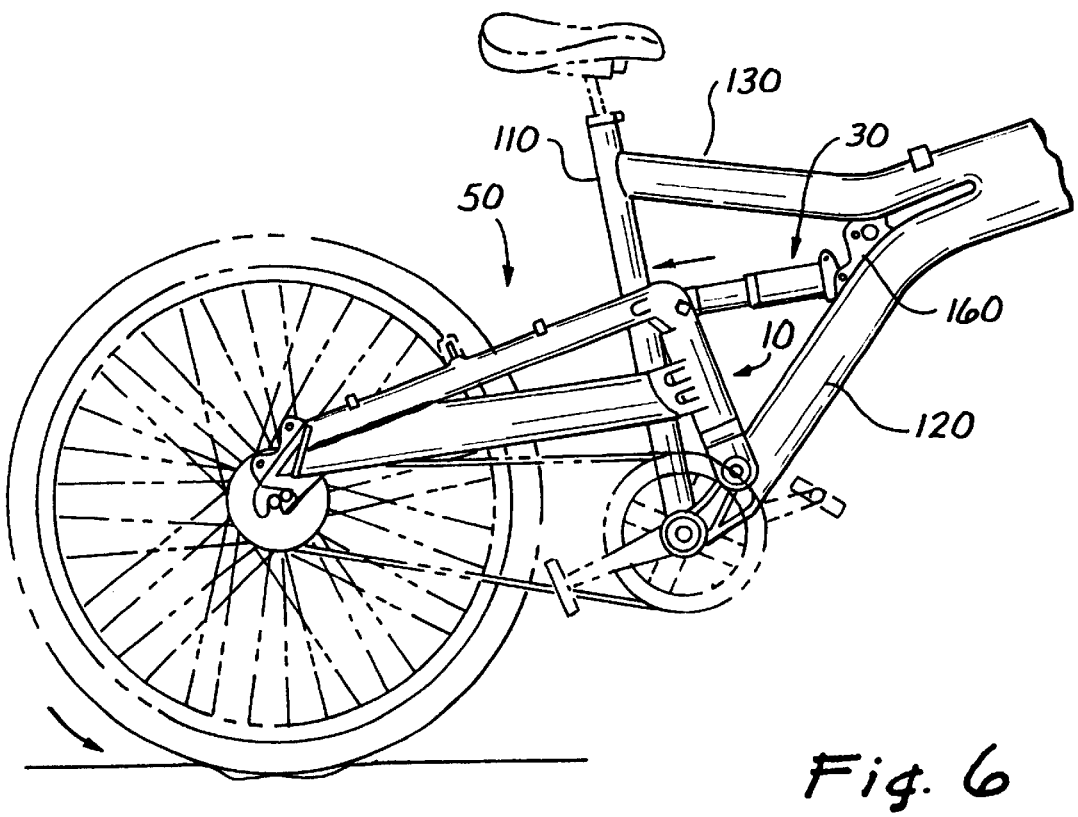
FIG. 6 is a side view of a preferred embodiment of the invention, illustrating the pivotal actions of the suspension system as the rear wheel encounters a depression in a biking surface.

FIGS. 5 and 6 illustrate many of the aspects of the invention mentioned heretofore, and in addition, generally depict the operational principles of the suspension system as the rear wheel encounters various obstacles. As persons of ordinary skill in the art can appreciate, as the rear wheel hits a rock or other similar obstacle above the biking surface, the wheel suspension system moves upward and causes the top of the linkage assembly to move forward and compress the shock absorber (see FIG. 5). In contrast, as the rear wheel encounters a depression, the suspension system allows the wheel to descend at least somewhat independently of the rest of the bike frame (and the rider mounted thereon) and the top of the linkage moves rearwardly as the shock absorber extends.

The apparatus and methods of my invention have been described with some particularity, but the specific designs, constructions and steps disclosed are not to be taken as delimiting of the invention in that various obvious modifications will make themselves apparent to those of ordinary skill in the art, all of which will not depart from the essence of the invention and all such changes and modifications are intended to be encompassed within the appended claims.

I claim:

1. A bicycle, including
a main fine having a bottom bracket, which is a generally cylindrical structure for holding a pedal crank assembly that rotates about an axis extending through the center of the generally cylindrical structure, and
a rigid rear wheel suspension system attached to the main frame at a single pivot axis, wherein the rear wheel suspension system includes
a seat stay and a chain stay, each stay having a forward end and a rearward end, wherein the rearward end of each stay is nonpivotably secured to a joint attached to an axle of a rear wheel; and
a single tubular upright member having a first end, a second end, and a midpoint area between the first and second ends, wherein the forward end of the seat stay is nonpivotably attached to the first end of the tubular upright member, and wherein the forward end of the chain stay is nonpivotably attached at the approximate midpoint area of the single tubular upright member, and the single tubular upright member is pivotably attached to the main frame of the bicycle above the main frame's bottom bracket.

2. The bicycle of claim 1, further comprising a shock absorber connected to the single tubular upright member and the main frame of the bicycle.

3. The bicycle of claim 1, wherein the forward ends of the seat stay and chain stay are welded to at least one swing arm attachment element of the single tubular upright member.

4. The bicycle of claim 1, wherein the single tubular upright member is pivotably attached to the main frame at the lower end of the single tubular upright member.

5. The bicycle of claim 1, wherein the suspension system is attached to the main frame at a pivot point that is located on a chain torque line.

6. The bicycle of claim 1, wherein the suspension system is attached to the main frame at a pivot point that is located on an average chain torque line.

7. A bicycle, including
a main frame, which includes a bottom bracket, which is a generally cylindrical structure for holding a pedal crank assembly that rotates about an axis extending through the center of the generally cylindrical structure, and
a rigid rear wheel suspension system attached to the main frame above the bottom bracket at a single pivot axis, wherein the suspension system includes a seal stay and a chain stay, each stay having a forward end and a rearward end, wherein the rearward end of each stay is nonpivotably secured to a joint attached to a rear wheel axle; and a single upright member, which includes a single elongated cylindrical body having a first end, a second end, and a midpoint area between the first and second ends; a connector pivotably attached to the bicycle frame at the single pivot axis, and at least one swing arm attachment element nonpivotably attached to the forward ends of the seal stays and chain stays, wherein the forward end of the seat stay is attached near the first end of the tubular upright member, and wherein the forward end of the chain stay is attached near the approximate midpoint area of the single tubular upright member.

8. The bicycle of claim 7, further comprising a shock absorber connected to the top of the single upright member and to the main frame.

9. The bicycle of claim 7, comprising a plurality of swing arm attachment elements, wherein the number of swing arm attachment elements corresponds to the number of seat stays and chain stays.

10. The bicycle of claim 7, wherein the pivot axis is located on a chain torque line.

11. The bicycle of claim 10, wherein the connector is located at the lower end of the single upright member.

12. A bicycle, including a main frame, which includes a bottom bracket, which is a generally cylindrical structure for holding a pedal crank assembly that rotates about an axis extending through the center of the generally cylindrical structure, and a rigid rear wheel suspension pivotably attached to the main frame at a single pivot axis, wherein the rear wheel suspension includes a pair of seat stays and chain stays nonpivotably attached to a rear wheel of the bicycle and extending forward from the rear wheel of the bicycle;

a single tubular upright member, which includes a single tubular elongated body having a first end, a second end, and a midpoint area between the first and second ends; a connector at the bottom of the elongated body attached to the bicycle frame at the single pivot axis, and a plurality of swing arm attachment elements welded to the forward ends of the seat stays and chain stays, wherein the forward end of the seat stay is attached near the first end of the tubular upright member, and wherein the forward end of the chain stay is attached near the approximate midpoint area of the single tubular upright member; and a shock absorber connected between the first end of the tubular upright member and the bicycle main frame.

13. The bicycle of claim 12, wherein the shock absorber is connected to a down tube of the main frame.

14. The bicycle of claim 12, wherein the pivot point is located on a chain torque line.

15. The bicycle of claim 12, wherein the pivot point is located on an average chain torque line.

* * * * *

UNITED STATES PATENT AND TRADEMARK OFFICE
CERTIFICATE OF CORRECTION

PATENT NO.    : 6,361,059 B1
DATED         : March 26, 2002
INVENTOR(S)   : Ellsworth It is certified that error appears in the above-identified patent and that said Letters Patent is hereby corrected as shown below:

Column 10,
Line 23, "a main fine" should read -- a main frame --.

Column 11,
Line 1, "a seal stay" should read -- a seat stay --.
Line 11, "forward ends of the seal stays" should read -- forward ends of the seat stays --.

Column 12,
Line 23, "pivot point" should read -- pivot axis --.
Line 25, "pivot point" should read -- pivot axis --.

Signed and Sealed this

Twenty-ninth Day of October, 2002

Attest:

JAMES E. ROGAN
Attesting Officer    Director of the United States Patent and Trademark Office